US010828998B2

(12) United States Patent
Weigel et al.

(10) Patent No.: US 10,828,998 B2
(45) Date of Patent: Nov. 10, 2020

(54) RAPID CHARGING SYSTEM AND METHOD FOR ELECTRICALLY CONNECTING A VEHICLE TO A CHARGING STATION

(71) Applicant: SCHUNK BAHN- UND INDUSTRIETECHNIK GMBH, Wettenberg (DE)

(72) Inventors: Wilfried Weigel, Dautphetal (DE); Matthias Domes, Bad Nauheim (DE); Tobias Gamsjäger, Salzburg (AT); Timo Staubach, Herbstein (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 128 days.

(21) Appl. No.: 15/762,673

(22) PCT Filed: Sep. 30, 2016

(86) PCT No.: PCT/EP2016/073447
§ 371 (c)(1),
(2) Date: Mar. 23, 2018

(87) PCT Pub. No.: WO2017/060172
PCT Pub. Date: Apr. 13, 2017

(65) Prior Publication Data
US 2018/0264959 A1 Sep. 20, 2018

(30) Foreign Application Priority Data
Oct. 7, 2015 (DE) .................. 10 2015 219 438

(51) Int. Cl.
*B60L 53/30* (2019.01)
*B60L 5/36* (2006.01)
(Continued)

(52) U.S. Cl.
CPC .............. *B60L 53/30* (2019.02); *B60L 5/36* (2013.01); *B60L 5/40* (2013.01); *B60L 53/16* (2019.02);
(Continued)

(58) Field of Classification Search
CPC .......... B60L 53/30; B60L 53/16; B60L 53/35; B60L 5/40; B60L 5/36
(Continued)

(56) References Cited

U.S. PATENT DOCUMENTS 8,723,477 B2 * 5/2014 Gaul .................... B60L 3/0069
320/109
8,957,634 B2 * 2/2015 Lo .......................... B60L 53/63
320/109
(Continued)

FOREIGN PATENT DOCUMENTS

CN 103492216 A 1/2014
DE 69601505 T2 8/1999
(Continued)

*Primary Examiner* — M Baye Diao
(74) *Attorney, Agent, or Firm* — King & Scickli, PLLC

(57) ABSTRACT

A quick charging system for electrically driven vehicles and method for forming an electrically conductive connection between a vehicle and a stationary charging station having a contact device, a charging contact device, and a positioning device. The charging contact device can be electrically contacted in a contact position together with the contact device. The contact device can be positioned in the vertical and horizontal direction relative to the charging contact device and moved to the contact position. The contact device has a contact element carrier with contact elements that can each be electrically contacted together with charge contact elements of the charge contact device, forming contact pairs, in the contact position. A guide device is provided, such that, when the contact device and the charge contact device are brought together, a physical contacting of the contact ele-
(Continued)

ments together with the charge contact device is inhibited before reaching the contact position.

16 Claims, 4 Drawing Sheets

(51) Int. Cl.
 *B60L 5/40* (2006.01)
 *B60L 53/35* (2019.01)
 *B60L 53/16* (2019.01)
(52) U.S. Cl.
 CPC ........... *B60L 53/35* (2019.02); *B60L 2200/18* (2013.01); *H01R 2201/26* (2013.01); *Y02T 10/7005* (2013.01); *Y02T 10/7088* (2013.01); *Y02T 90/121* (2013.01); *Y02T 90/125* (2013.01); *Y02T 90/14* (2013.01)
(58) Field of Classification Search
 USPC ......................................................... 320/109
 See application file for complete search history.

(56) References Cited

U.S. PATENT DOCUMENTS

| | | | |
|---|---|---|---|
| 10,227,013 B2 * | 3/2019 | Tajima | B60L 5/08 |
| 2013/0076294 A1 * | 3/2013 | Smith | B60L 53/52 |
| | | | 320/101 |
| 2013/0076902 A1 | 3/2013 | Gao et al. | |
| 2016/0023564 A1 * | 1/2016 | Warner | B60L 53/32 |
| | | | 320/109 |
| 2016/0159232 A1 * | 6/2016 | Weigel | G02B 5/32 |
| | | | 320/109 |

FOREIGN PATENT DOCUMENTS

| | | |
|---|---|---|
| DE | 102013206840 A1 | 10/2014 |
| DE | 102013019534 A1 | 5/2015 |
| KR | 20090101429 A | 9/2009 |
| WO | WO2014112926 A1 | 7/2014 |
| WO | WO2015018887 A1 | 2/2015 |
| WO | WO2015068221 A1 | 5/2015 |

* cited by examiner

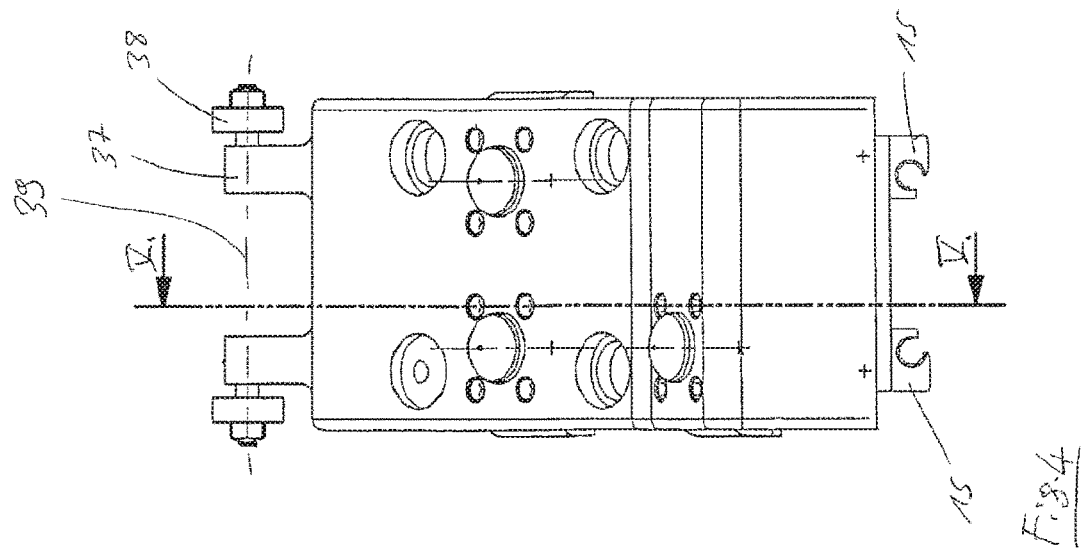
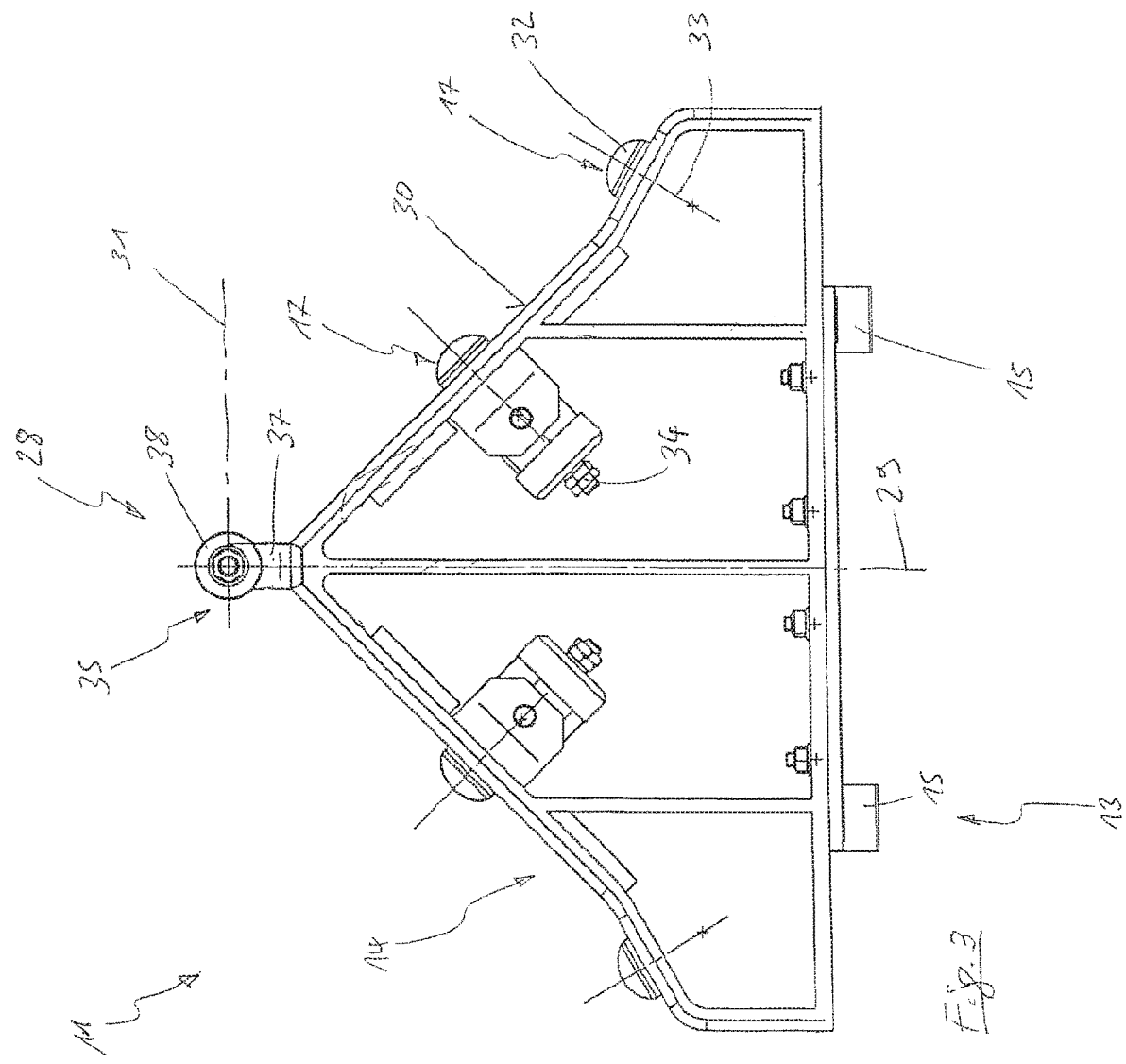

US 10,828,998 B2

RAPID CHARGING SYSTEM AND METHOD FOR ELECTRICALLY CONNECTING A VEHICLE TO A CHARGING STATION

FIELD OF THE INVENTION

The invention relates to a rapid charging system for electrically driven vehicles, in particular electric busses or similar, and a method for forming an electrically conductive connection between a vehicle and a stationary charging station having a contacting device, a charging contact device and a positioning device, said contacting device or said charging contact device being able to be arranged on a vehicle, said charging contact device being able to be electrically contacted using the contacting device when in a contacting position, said contacting device being able to be positioned in a vertical and horizontal direction with respect to the charging contact device as well as be moved to the contacting position by means of the positioning device, said contacting device comprising a contacting element carrier having contacting elements, said contacting elements being able to be electrically contacted with charging contact elements of the charging contact device for realizing contact pairings in each instance when in the contacting position, said rapid charging system comprising a guiding device for guiding the contacting device or the charging contact device to the contacting position.

Background of the Invention

Such rapid charging systems and contacting devices, charging contact devices and methods are already known from the state of the art and are regularly used for rapidly charging electrically driven vehicles at a stop or at a stopping point. Electrically driven vehicles used in local transport, such as busses, can be continuously supplied with electrical energy, inter alia, via an overhead wire. In order to be able to use the advantages of an electrical drive without an overhead wire network as well, it is known to equip means of public transport with batteries or other kinds of energy storage. A continued operation of the means of transport can only be ensured if the battery can be rapidly charged while stopping at a stop of the means of transport. In this context, different rapid charging systems for producing an electrically conductive connection between a stationary charging station in the area of a stop and a vehicle or rather an electric bus are known from the state of the art. Thus on an electric bus, a so-called current collector having a contact strip can be arranged on a roof of an electric bus, a rail extending longitudinally in the moving direction of the electric bus being suspended over a road in the area of the stop. When the electric bus stops at the stop, the current collector is moved upward from the roof of the bus towards the rail, whereby an electric connection is realized for the duration of the intended stop of the electric bus at the stop so that the battery can be rapidly charged in this period. In particular, however, two current collectors, which are separate from each other, and corresponding contacting areas are required on the rail so as to be able to realize a charging circuit.

Furthermore, contacting elements can be required for a control line, earth, or a data transfer, for example. Several contacting elements are arranged on a contacting device of a current collector or rapid charging system and can be contacted with a corresponding amount of charging contact elements, which are arranged in the moving direction of the electric bus and can be designed as parallel rails, for example. A larger amount of contact pairings can thus be realized simultaneously. In particular, electrical connecting lines thus additionally realized can be used between the stationary charging station and the vehicle, for example for controlling and monitoring a charging process.

In a known rapid charging system, a charging contact device is lowered at the stationary charging station in the direction of a roof of an electric bus. The charging contact device is initially contacted with the roof of the electric bus which is then positioned in the moving direction with respect to the charging contact device in such a manner that the charging contact device is guided to a rail of a contacting device arranged on the roof. The rail is provided with corresponding contacts for producing an electric connection. In this context, it is particularly disadvantageous that the charging contact device slides along the rail or the roof of the electric bus until it reaches the corresponding contacts of the contacting device. By repeatedly guiding the contacting device along the rail to the contacting position, the friction results in a not insignificant abrasion which is further promoted through detrimental weather conditions and impurities.

In another known rapid charging system, a roof-shaped charging contact device is contacted by a correspondingly designed contacting device. The contacting device is guided to a contacting position by means of contacting elements being able to slide along the roof-shaped inclines of the charging contact device when in the contacting position in such a manner that the contacting device is centered in the charging contact device. Owing to the fact that the contacting elements are guided along the roof-shaped inclines of the charging contact device before the contacting position is attained, the contacting elements or a surface of the charging contact device, respectively, are also unintendedly abraded so that the contacting elements also have to be regularly exchanged due to a frequent physical contact with the charging contact device in regular intervals in order to enable a reliable contacting.

A pinpoint insertion of the contacting device with respect to the charging contact device when in the contacting position is rather random. In particular as a function of a payload of the electric bus, the electric bus can be positioned higher or lower when stopping with respect to the charging contact device. Even when lowering the electric bus on the passenger side in order to facilitate access for passengers, the contacting device or rather the contacting elements are displaced with respect to the charging contact device so that an electric contact can also be interrupted. If parallel rails are used, it is incidentally also required to position the electric bus fairly precisely in an area of the stop intended for this purpose. A position deviating from an intended position of the electric bus as well as a one-sided lateral lowering of the electric bus can prevent successfully contacting or connecting the vehicle and a stationary charging station and poses a considerable risk. Consequently, conductors can be unintentionally contacted or connected and short circuits can occur which can damage components of the rapid charging system or persons standing nearby.

SUMMARY OF THE INVENTION

The object of the invention at hand is therefore to propose a rapid charging system and a method for forming an electrically conductive connection between a vehicle and a charging station, which enables an inexpensive operation of the means of transport and safe contacting.

The object is attained by a rapid charging system having the features of claim 1 and a method having the features of claim 21.

The rapid charging system according to the invention for electrically driven vehicles, in particular electric busses or similar, for forming an electrically conductive connection between a vehicle and a stationary charging station comprises a contacting deice, a charging contact device and a positioning device, said contacting device or said charging contact device being able to be arranged on a vehicle, said charging contact device being able to be electrically contacted using the contacting device when in a contacting position, said contacting device being able to be positioned in a vertical and horizontal direction with respect to the charging contact device as well as be moved to the contacting position by means of the positioning device, said contacting device comprising a contacting element carrier having contacting elements, said contacting elements being able to be electrically contacted with charging contact elements of the charging contact device when in the contacting position for realizing contact pairings in each instance, said rapid charging system comprising a guiding device for guiding the contacting device or the charging contact device to the contacting position, said guiding device being designed such that when guiding the contacting device and the charging contact device together, a physical contact between the contacting elements and the charging contact device is prevented before the contacting position is attained.

By means of the guiding device, when guiding the contacting device and the charging contact device together, the physical contact between the contacting elements and the charging contact device is consequently prevented from being possible in the first place before the contacting position is attained. This means that the physical contact between the contacting elements and the charging contact device is not formed or produced until the contacting position is attained. Thus, the contacting elements cannot slide along the charging contact device or rather its surfaces over larger distances, whereby an undesired abrasion of the contacting elements or the surface of the charging contact device, respectively, is avoided. A service life of the contacting elements and the charging contact device can thus be considerably prolonged. A safe contacting also becomes possible since surfaces of the contacting elements and the charging contact device are not considerably worn by abrasion. Owing to the fact that the contacting elements and the charging contact elements are barely abraded, servicing intervals for the rapid charging system can be extended and thus the respective means of transport can be conducted more inexpensively. Nevertheless, it is possible to be able to randomly contact the contacting device with the charging contact device in a pinpoint manner so that the guiding device would not be required in this instance. As the contacting device and the charging contact device are positioned with respect to each other so as to deviate from an attainable contacting position when stopping, for example when an electric bus stops at a stopping point, the guiding device will positively impact the process of guiding the contacting device and the charging contact device together.

The contacting device and the charging contact device can each comprise a vertical axis, said respective vertical axes being able to align flush when in the contacting position. The vertical axes can extend vertically with respect to a road so as to be able to guide the contacting device and the charging contact device together in a vertical direction. Generally, however, it is also possible to be able to guide the contacting device and the charging contact device in a horizontal direction.

Furthermore, a physical contact between the contacting elements and the charging contact device can be prevented if the respective vertical axes are positioned so as to deviate from a shared flush alignment. This means that if the vertical axes of the contacting device and the charging contact device are not arranged flush with respect to each other, the physical contact also cannot be realized. Only when the guiding device has positioned or oriented the contacting device and the charging contact device with respect to the each other so that the respective vertical axes align flush or are positioned in a shared flush alignment, can the physical contact be realized.

The guiding device accordingly can position the respective vertical axes in a shared flush alignment when guiding the contacting elements and the charging contact device together. This can already occur when guiding the contacting device and the charging contact device together, for example.

The contacting elements and/or the charging contact elements can also be designed such that the physical contact between the contacting elements and the charging contact device is prevented if the respective vertical axes are positioned so as to deviate from a shared flush alignment by an angle $\alpha$ of $>2°$, preferably $>5°$, particularly preferably $>10°$. A tolerance range can then be yielded which permits a comparatively slight deviation or inclination of the vertical axes with respect to each other, an electrically conductive physical contact still being able to be realized at said deviation or inclination. This inclination can be formed when lowering an electric bus on a passenger side, for example. The tolerance range can be easily yielded by forming comparatively large contacting surfaces of the contacting elements and/or charging contact surfaces of the charging contact elements.

The contacting element carrier can form two, preferably three, positioning surfaces which are formed so as to conform to abutment surfaces of the charging contact device for abutting against the contacting element carrier. The positioning surfaces of the contacting element carriers can then be set snug against the abutment surfaces of the charging contact device when in the contacting position so that the contacting element carrier can be correctly positioned in its intended position on the charging contact device when guiding the contacting element and the charging contact device together without any undesired displacement of the contacting element carrier when in the contacting position. In particular, the positioning surfaces can comprise a geometric or relative arrangement with respect to each other, which coincides such with the abutment surfaces that guiding the contacting element carrier and the charging contact device to the defined contacting position in a form-fitting manner so as to yield a connection like between a plug and a socket is ensured. In this context, the positioning surfaces and the abutment surfaces can be designed such that they form the guiding device together.

The guiding device can comprise a spacing means which can be arranged on the contacting device and/or the charging contact device. The spacing means can be designed such that the contacting elements can be contacted with the charging contact device only when in the contacting position. For this purpose, the spacing means can be formed or arranged on the contacting device, the charging contact device or on both devices, respectively. The spacing means consequently spaces the contacting device from the charging contact device when guiding the two together for as long as the contacting position has not been attained. The spacing means can be arranged between a positioning surface of the contacting element carrier and an abutment surface of the charging contact device when not in the contacting position. If the spacing means is formed from an element or a form or shape of the contacting element carrier or of the charging contact device, the spacing means can by all means be contacted with a surface of the charging contact device or the contacting device, it being ensured via the guiding device or rather its shape that this occurs in areas of the respective surface, in which a material abrasion or potential damage does not impact a function of the rapid charging system.

Thus, the spacing means can comprise a spacer which can be guided along a positioning surface of the contacting device or an abutment surface of the charging contact device. The spacer can, for example, be formed from a rod-shaped or curve-shaped element which prevents the physical contact of the contacting elements when not in the contacting position. The spacer can, for example, be made of an inexpensive plastic material or of a material having good sliding properties, such as PTFE. The spacer can then slide along the positioning surface or the abutment surface, respectively, when guiding the contacting element carrier and the charging contact device together. The spacing means can also comprise a plurality of spacers.

The spacer can comprise at least one roll which can be rolled on the positioning surface or the abutment surface. The roll can be arranged on a far end of the spacer. Thus, the positioning surface or the abutment surface is contacted only with the roll of the spacer, whereby friction and consequently wear of the guiding device can be significantly reduced. Several rolls can be arranged on the spacer as well.

The spacer can extend along the positioning surface of the contacting device or the abutment surface of the charging contact device or be realized such with respect to a longitudinal axis of the contacting device or the charging contact device. In the event that the respective longitudinal axes of the contacting device and the charging contact device are not arranged parallel to each other with respect to a vertical axis but are rather positioned at an angle or so as to be crossed, the spacer extending longitudinally can be used for initially positioning the respective longitudinal axes parallel to each other before the contacting position is attained. However, several spacers can be arranged or formed along the longitudinal axes of the contacting device or the charging contact device.

The spacing means can be arranged on an end of the contacting device facing towards the charging contact device or an end of the charging contact device facing towards the contacting device. As the respective end facing towards the respective device is contacted with either the contacting device or the charging contact device for the first time when guiding the contacting device and the charging contact device together, it is advantageous if the spacing means is arranged on the respective end facing towards the respective device and can guide a movement to the contacting position when guiding the charging contact device and the contacting device together. If, for example, the contacting device is realized so as to be pointed, the spacing means can be arranged on the point of the contacting device, said spacing means being able to be arranged in the area of eaves of the charging contact device in each instance if the charging contact device is realized so as to be roof-shaped.

It is particularly advantageous if the charging contact device and/or the contacting device comprise(s) a receptacle recess of the guiding device for the spacing means when in the contacting position. When in the contacting position, the spacing means can engage the receptacle recess or be guided therein. The spacing means hence no longer has to space the charging contact device from the contacting device when in the contacting position in order to prevent a physical contact between the contacting elements. The receptacle recess can be realized as a central groove in a roof-shaped charging contact device. Provided several spacing means are intended, several conformingly realized receptacle recesses can also be formed for the respective spacing means. The contacting element carrier can, for example, be designed narrow in comparison to the charging contact device so that spacing means of the charging contact device can be positioned beyond or beside the contacting element carrier when in the contacting position. A contacting element carrier shortened at the sides in such a manner therefore forms receptacle recesses on its side surfaces.

In an embodiment, the contacting device can be arranged on a vehicle roof and the charging contact device can be arranged on a stationary charging station or vice versa. In this context, the vehicle roof can be a vehicle roof of an electric bus or of a trolley car, for example. For this purpose, it can also be intended, for example, to position the contacting device on the vehicle roof in such a manner that the contacting device is arranged on a driver's side of the vehicle roof in a moving direction. Positioning the contacting device below a charging contact device is thus immensely facilitated for a driver of the vehicle since this charging contact device or rather its position is in the driver's line of vision.

The charging contact device can comprises a charging contact element carrier having charging contact elements. Advantageously, the charging contact element carrier can be made of a plastic material. The charging contact device is then particularly inexpensive and is easier to be produced. The contacting element carrier can thus also be realized integrally when made of plastic. The charging contact elements can then be easily integrated in the charging contact element carrier or rather in the holders intended therefor or in recesses.

The charging contact element carrier can form a receptacle opening for the contacting element carrier, said contacting element carrier being able to be inserted into the receptacle opening of the charging contact element carrier. Preferably, the receptacle opening can be formed in a V shape for this purpose. The V-shape form of the receptacle opening causes the contacting element carrier to be centered when guiding the contacting device and the charging contact device towards the receptacle opening at a relative deviation of the contacting element carrier.

Thus, the receptacle recess can form a guide for the contacting element carrier when guiding the contacting element carrier and the charging contact element carrier together. Potential deviations in the position of the vehicle from an intended stopping position when stopping at a stop can thus be easily compensated at the charging contact device by the guiding of the contacting element carrier to the contacting position caused by the receptacle opening. The guiding is always carried out by means of the guiding device in the event that the contacting position is not yet attained.

Furthermore, the charging contact element carrier can be realized as a roof-shaped longitudinal rail being able to be arranged in a moving direction of the vehicle, the charging contact elements being able to be realized as conductor strips. The charging contact elements can then be arranged on an underside of the roof-shaped longitudinal rail so that the charging contact elements are not directly exposed to the effects of the weather. The roof-shaped longitudinal rail can also be designed so as to be comparatively long, making an exact positioning of the vehicle at a stop redundant. The roof-shaped longitudinal rail can preferably be formed open at its ends so that the contacting element carrier can be inserted into or extracted from the roof-shaped longitudinal rail in the moving direction as well. Vice versa, the roof-shaped longitudinal rail can be arranged on a vehicle roof in such a manner that an underside of the roof-shaped longitudinal rail is turned upward. The charging contact elements are then directly exposed to the weather; however, rainwater can be easily drained via open ends of the longitudinal rail, for example.

The charging contact elements can be advantageously realized as a conductor strip so that the charging contact elements form a comparatively large surface, which can be contacted, for the contacting elements. The conductor is also easy to produce, for example by using a semi-finished product as a conductor strip. Vice versa, it is also possible to form the contacting elements as conductor strips on the contacting element carrier and to form the charging contact elements as having contacting elements.

The contacting elements are bolt-shaped and can be resiliently mounted on the contacting element carrier. The contacting elements can thus be produced particularly easily, the resilient mounting being effected via a simple pressure spring within a contacting element. Consequently, a punctiform contact with a charging contact element of the charging contact device can be realized in a spring-loaded manner. Furthermore, it can also be intended that a plurality of contacting elements is provided, for example for a power contact pairing. This makes sense in particular if the charging contact element of the charging contact device is realized having a comparatively large surface so as to be able to safely transfer a larger current via the bolt-shaped contacting elements. Preferably, two contacting elements can be intended for each phase or power contact, respectively. Deviating from the embodiments described above, it can be intended in this context to not form the contacting elements in the shape of bolts on the contacting element carrier but rather to equip the charging contact device with bolt-shaped charging contact elements and vice versa.

The positioning device can comprise a pantograph or a rocker by means of each of which the contacting device can be positioned in a vertical direction with respect to the charging contact device or to the vehicle, respectively. In the case of the rocker, a supplementary linkage can be provided which stabilizes the contacting device with respect to the charging contact device or, respectively, orients the contacting device in the corresponding direction. A pantograph or a rocker or, respectively, a corresponding mechanical drive can be produced particularly easily and inexpensively.

The positioning device can comprise a crossbeam by means of which the contacting element carrier can be positioned fairly transversally to the charging contact device, said contacting element carrier being arranged on the crossbeam so as to be freely displaceable. The crossbeam can optionally be arranged on a vehicle or on a pantograph or a rocker of the positioning device. In all three cases, the positioning device or rather a contacting element carrier being able to be arranged on the positioning device can be displaced transversally to the moving direction of the vehicle. Via this displaceability, an erroneous positioning of the vehicle can be compensated at a stop transversally to the moving direction, for example. Moreover, potential vehicle movements caused by a one-sided lowering of the vehicle when people ascend and descend the vehicle can be compensated in such a manner that the contacting element carrier cannot be displaced in the transverse direction with respect to the charging contact device.

The crossbeam can be arranged on a far end of a pantograph or a rocker. Thus, it is no longer necessary for the rocker or the pantograph to be moved transversally to the moving direction but rather it suffices to move only the contacting element carrier along the crossbeam. Thus, a mass to be moved is reduced. A smaller torque or, respectively, no substantial transverse forces are any longer exerted on a pantograph or a rocker. Preferably, the crossbeam can be mounted directly on a far upper end of the pantograph or the rocker in a stationary manner so as to be able to move the contacting element carrier along the crossbeam. The crossbeam can be realized as a straight linear guide or also as an arcuate linear guide. The arcuate linear guide can comprise a radius of an arc which corresponds to a height of the crossbeam over a road. Optionally, it can also be intended to arrange the charging contact device instead of the contacting element carrier on the crossbeam.

In the method according to the invention for realizing an electrically conductive connection between a vehicle and a stationary charging station, in particular for a rapid charging system for electrically driven vehicles, such as busses or similar, having a contacting device, a charging contact device and a positioning device, the charging contact device is electrically contacted with the contacting device when in a contacting position, said contacting device being positioned in a vertical or horizontal direction with respect to the charging contact device as well as being moved to the contacting position by means of the positioning device, contacting elements of a contacting element carrier being electrically contacted with charging contact elements of the charging contact device when in the contacting position for realizing contact pairings in each instance, a guiding device of the rapid charging system guiding the contacting device or the charging contact device to the contacting position, when guiding the contacting device and the charging contact device together, a physical contact between the contacting elements and the charging contact device being prevented by means of the guiding device before the contacting position is attained when guiding the contact device and the charging contact device together.

Regarding the advantages of the method according to the invention, the description of advantages of the rapid charging system according to the invention is referred to. Further advantageous embodiments of the method are derived from the dependent claims referring to claim 1.

BRIEF DESCRIPTION OF THE DRAWING FIGURES

In the following, a preferred embodiment of the invention is further described with reference to the attached drawings.

In the following,

FIG. 3 illustrates a contacting device of the rapid charging system from a frontal view;

FIG. 4 illustrates the contacting device from a lateral view;

DETAILED DESCRIPTION OF THE INVENTION

Figure 1:
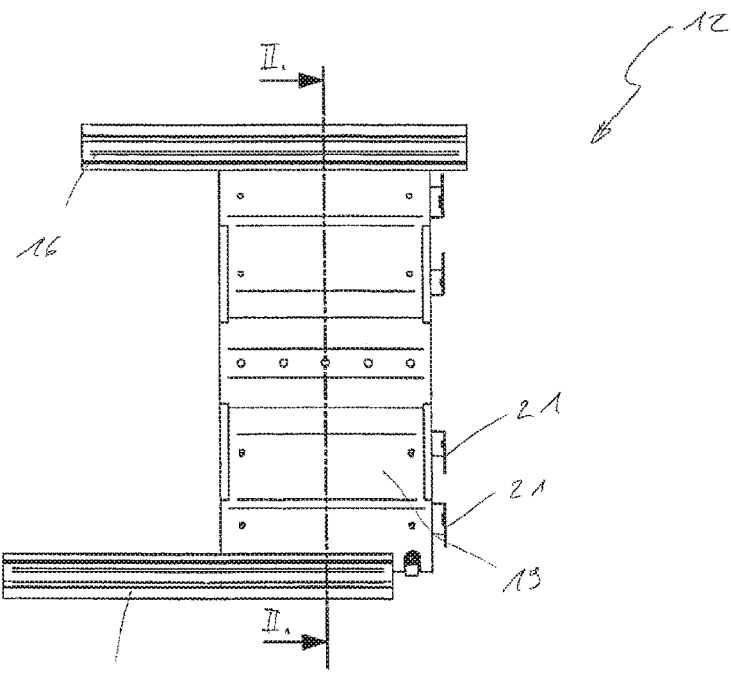
FIG. 1 illustrates a charging contact device of a rapid charging system in a view from below.
Figure 2:
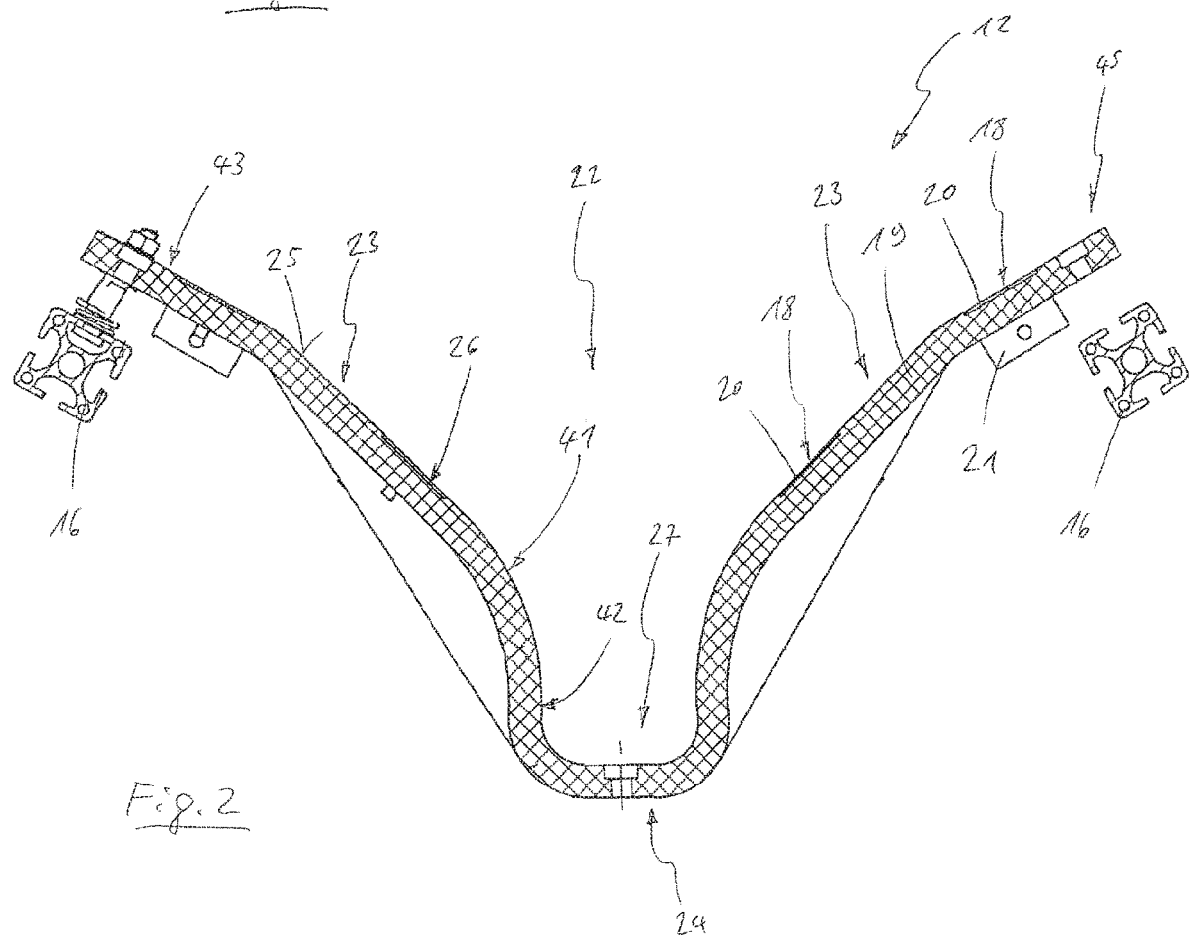
FIG. 2 illustrates the charging contact device in a cross-sectional view along line II-II from FIG. 1.

A synopsis of FIGS. 1 to 6 illustrates a rapid charging system 10 or rather individual representations of a contacting device 11 and a charging contact device 12. Furthermore, the rapid charging system 10 comprises a positioning device 13 only partially illustrated in this instance. A displacement bearing 15 of a crossbeam (not further illustrated in this instance) of the positioning device 13 is arranged on a contacting element carrier 14 of the contacting device 11.

In this embodiment of the rapid charging system 10 illustrated in this instance, the charging contact device 12 is fastened on a roof (not illustrated) of a vehicle or rather an electric bus by means of mounting profiles 16. The contacting element carrier 14 is suspended above the electric bus in the area of a stop of the electric bus by means of a suspending device (not further illustrated in this instance) of the positioning device 13. The suspending device enables, inter alia, vertically moving the contacting device 11. Consequently, the contacting element carrier 14 of the contacting device 11 can be positioned with respect to the charging contact device 12 by means of the positioning device 13.

The contacting element carrier 14 comprises contacting elements 17 which can be contacted with charging contact elements 18 of a charging contact element carrier 19 of the charging contact device 12. The charging contact element carrier 19 is essentially made of a plastic material, the charging contact elements 18 themselves each being realized as conductor strips 20 and extending in a longitudinal direction of the charging contact element carrier 19. The conductor strips 20 serve for transmitting a charging current and can each be a phase conductor, protective conductor or a control conductor. Apart from that, contact lugs 21 for connecting a line (not further illustrated in this instance) are provided on each conductor strip 20. A receptacle recess 22 of the charging contact element 18 is formed having a V shape in such a manner that two symmetric legs 23 are connected via a horizontal crosspiece 24. The charging contact device 12 forms abutment surfaces 25 for the contacting element carrier 14 within the receptacle recess 22. Recesses 26 for receiving the conductor strips 20 in a flushly aligned manner are formed on each of the legs 23 within the abutment surfaces 25. The legs 23 are spaced so far from each other by means of the crosspiece 24 that a receptacle recess 27 is formed.

Figure 5:
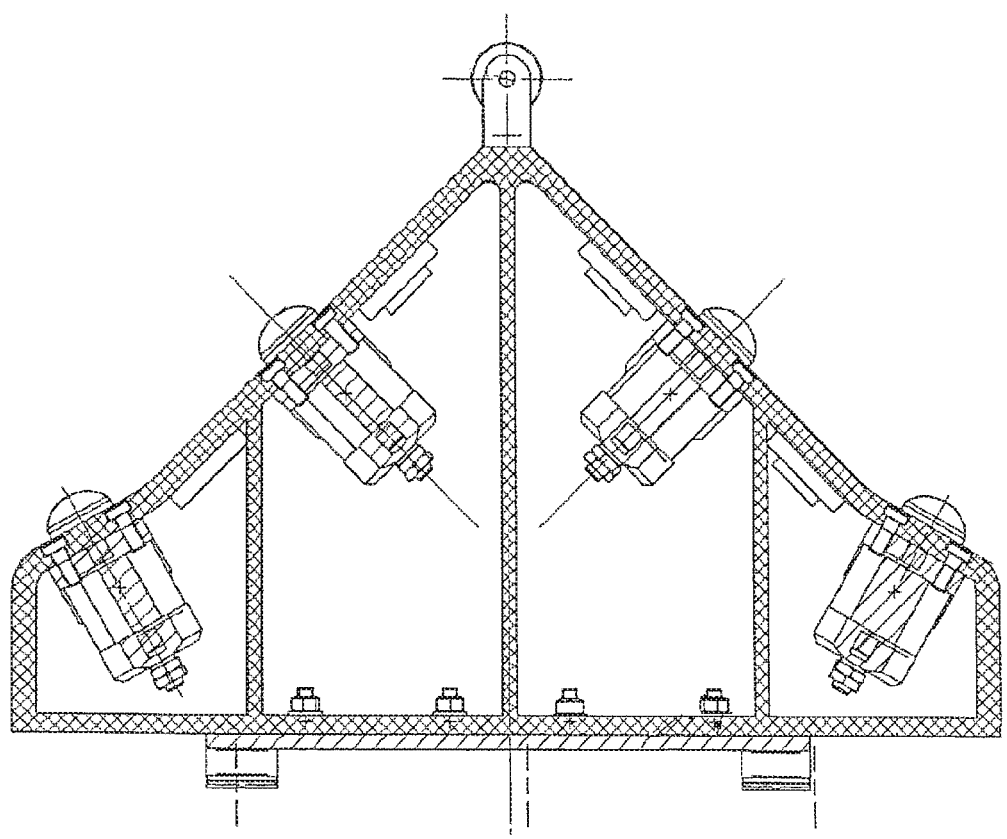
FIG. 5 illustrates the contacting device in a cross-sectional view along line V-V from FIG. 4.

A synopsis of FIGS. 3 to 5 illustrates the contacting element carrier 14 in various views. At a sharp end 28, the contacting element carrier 14 is V-shaped with respect to a vertical axis 29 in concordance with the receptacle recess 22 of the charging contact device 12. Two positioning surfaces 30 are realized having an incline with respect to a horizontal plane 31. The positioning surfaces 30 can consequently be abutted against the abutment surfaces 25 when in a contacting position. Within each of the positioning surfaces 30, two contacting elements 17 are arranged which protrude from said positioning surfaces 30. The contacting elements 17 each comprise a contacting bolt 32 which is resiliently mounted in the direction of a longitudinal axis 33 of the contacting bolt 32. When in a contacting position not illustrated in this instance, a contact pairing between the contacting bolts 32 and each of the allocated conductor strips 20 is yielded so as to be able to transmit electric power via the conductor strips 20 and the contacting bolts 32. A contacting clamp 34 for connecting a line (not further illustrated in this instance) is provided on each of the contacting elements 17.

A spacing means 35 of a guiding device 36 of the rapid charging system 10 is arranged on the sharp end 28 of the contacting element 14 which is made of plastic material. The spacing means 35 comprises a few spacers 37, each having a roll 38. The rolls 38 are consequently arranged along a longitudinal axis 39 of the contacting element carrier 14.

Figure 6:
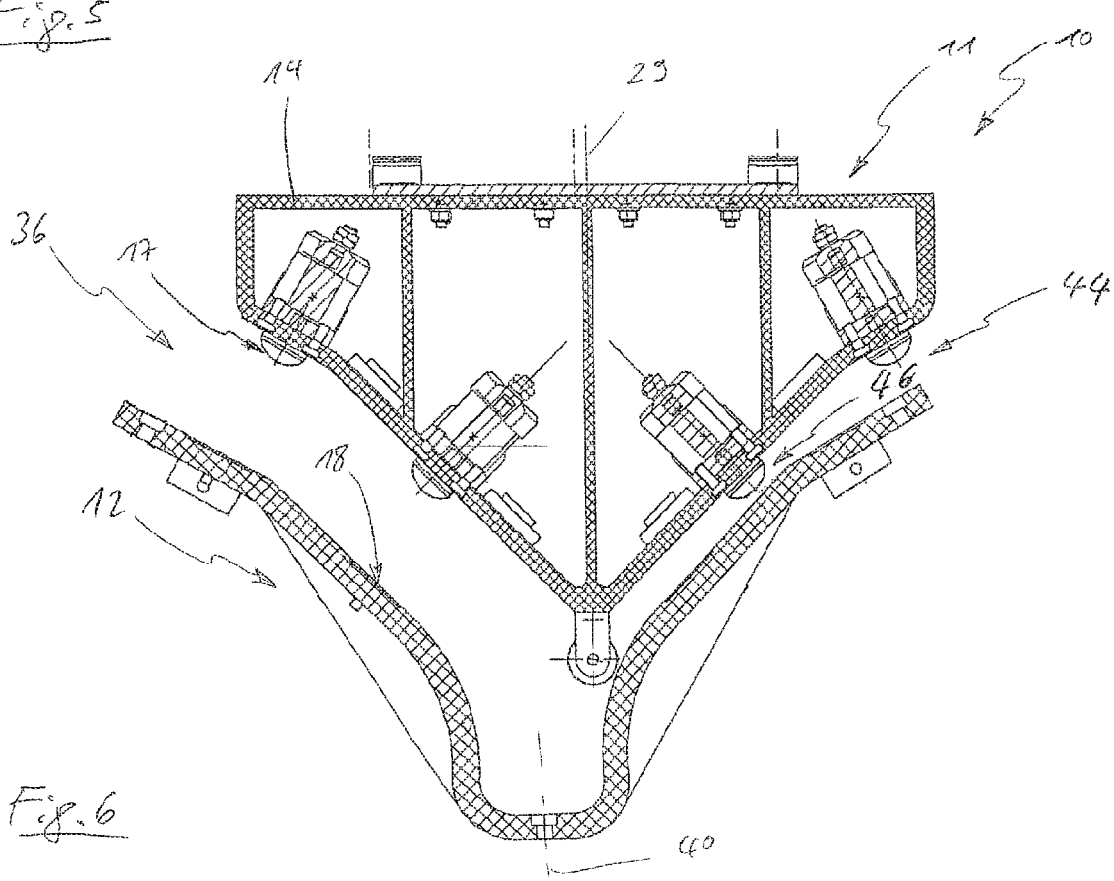
FIG. 6 illustrates the rapid charging system in a cross-sectional view while the contacting device and the charging contact device are guided together.

FIG. 6 illustrates guiding the contacting device 11 and the charging contact device 12 together, the vertical axis 29 in the contacting device 11 not being aligned flush with a vertical axis 40 of the charging contact device 12 in this instance. When guiding the contacting device 11 and the charging contact device 12 together, the roll 38 is thus initially contacted with the abutment surface 25 so that the contacting bolts 32 are spaced from the abutment surface 25 or, respectively, the conductor strips 20 via a gap 44 or 46, respectively. When guiding the contacting device 11 and the charging contact device 12 together again or when decreasing a space, the contacting element carrier is displaced in the transverse direction along the crossbeam (not illustrated in this instance) by means of the displacement bearings 15 until the spacer 37 is received in the receptacle recess 27 in conjunction with the roll 38 and the vertical axes 29 and 40 essentially align flush. When in this contacting position, the contacting bolts 32 are contacted with the charging contact device 12 or rather the conductor strips 20 for the first time without the contacting bolts 32 having been displaced along the abutment surface 25 while being in physical contact over a longer distance. The respective positioning surfaces 30 and the abutment surfaces 25, which by then abut against each other, ensure a concluding centering of the contacting device 11 or rather the contacting element carrier 14 in the receptacle recess 22. In this instance, the spacer 37 having the roll 38 forms the guiding device 36 forms the guiding device 36 in conjunction with the respective abutment surface 25.

In order to prevent a physical contact of the contacting bolts 32 before the contacting position is attained, the legs 23 can comprise an arcuate section 41 via which the roll 38 is guided over a vertical section 42 of the leg 23. Furthermore, a particularly flat angled section can be formed on the legs 23. Thus it becomes possible to form a comparatively wide gap 44 on an end of the leg 23, said gap 44 following a narrow gap 46 in the direction of the vertical axis 40 and consequently prevents a physical contact when not in the contacting position when the vertical axes 29 and 40 tilt.

Figure 7:
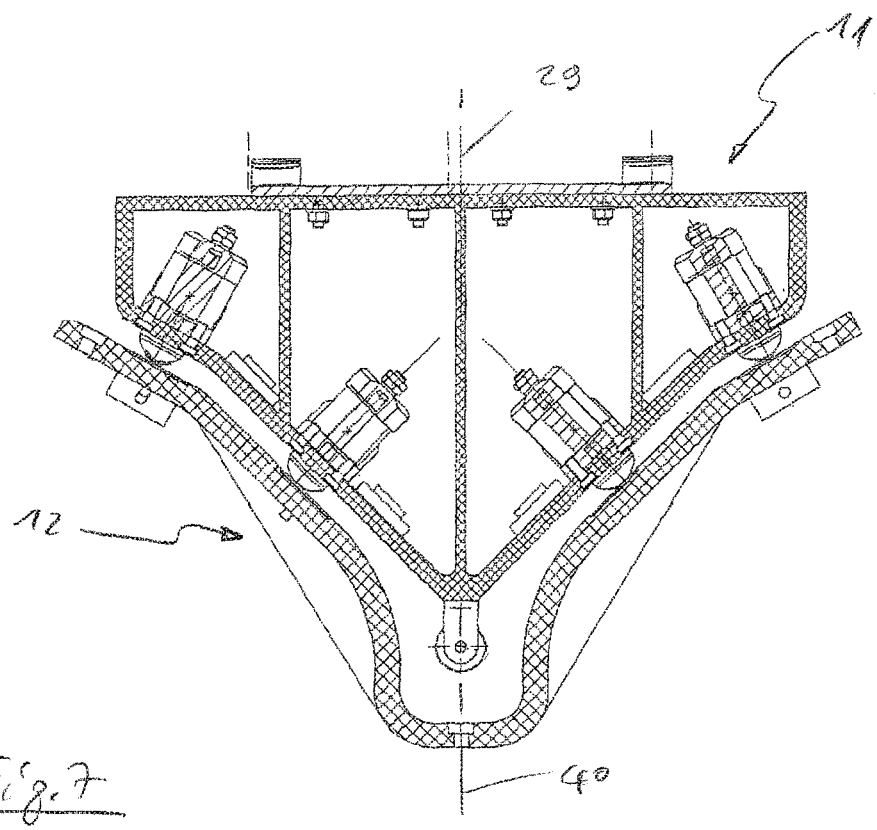
FIG. 7 illustrates the rapid charging system in a cross-sectional view when in a contacting position.

FIG. 7 illustrates the contacting device 11 when guided towards the charging contact device 12 in the contacting position, said vertical axes 29 and 40 essentially aligning flush.

Figure 8:
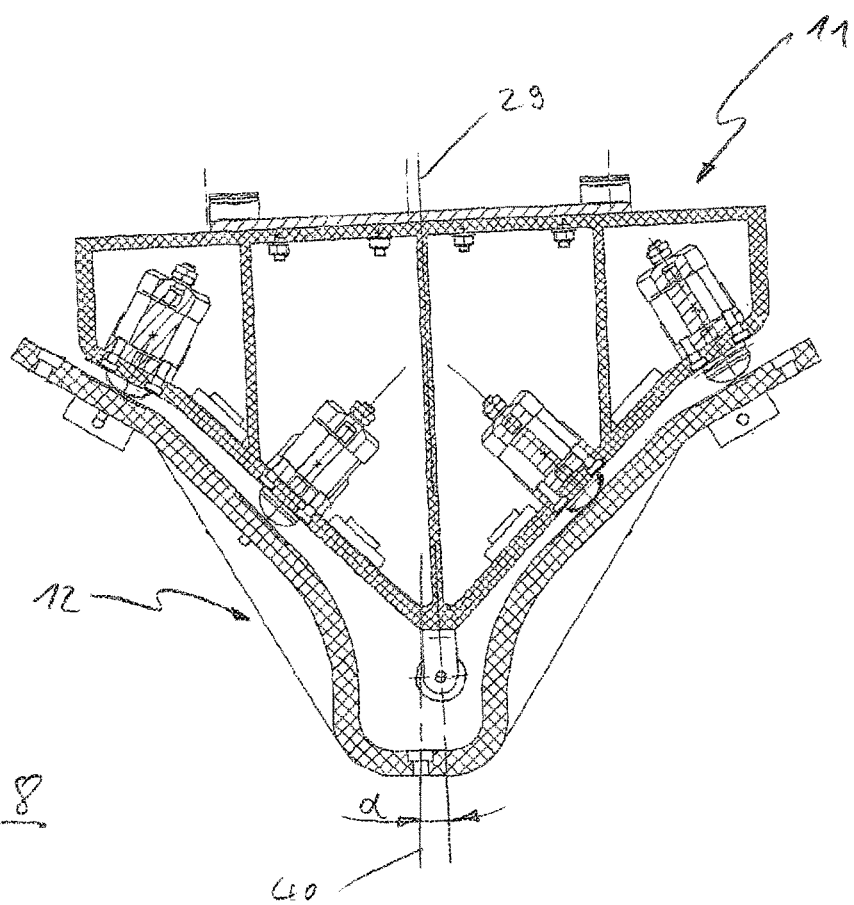
FIG. 8 illustrates the rapid charging system in a cross-sectional view when in a deviating contacting position.

FIG. 8 illustrates the contacting device 11 guided towards the charging contact device 12 in a deviating contacting position, the vertical axes 29 and 40 being positioned with respect to each other at an angle α deviating from a shared flush alignment. The conductor strips 20 are still contacted with the contacting bolts 32 in an electrically conductive manner since the conductor strips 20 are realized sufficiently large and the contacting bolts 32 are designed so as to be resiliently mounted and consequently an adjustment to the comparatively low angular offset can be carried out.

The invention claimed is:

1. A rapid charging system (10) for electrically driven vehicles, in particular electric busses or similar, for realizing an electrically conductive connection between a vehicle and a stationary charging station having a contacting device (11), a charging contact device (12) and a positioning device (13), said contacting device and said charging contact device being able to be arranged on a vehicle, said charging contact device being able to be electrically contacted using the contacting device when in a contacting position, said contacting device being able to be positioned in a vertical and horizontal direction with respect to the charging contact device as well as be moved to the contacting position by means of the positioning device, said contacting device comprising a contacting element carrier (14) having contacting elements (17), said contacting elements being able to be electrically contacted with charging contact elements (18) of the charging contact device for realizing contact pairings in each instance when in the contacting position, said rapid charging system comprising a guiding device (36) for guiding the contacting device and the charging contact device to the contacting position, characterized in that the guiding device is designed such that when guiding the contacting device and the charging contact device together, a physical contact between the contacting elements and the charging contact device is prevented before the contacting position is attained;

wherein the guiding device (36) comprises a spacing means (35) which is arranged on the contacting device (11) and/or the charging contact device (12), the spacing means (35) comprises a spacer (37) adapted to be guided along a positioning surface (30) of the contacting device (11) or along an abutment surface (25) of the charging contact device (12), and the spacer (37) comprises at least one roll (38) adapted to be rolled on the positioning surface (30) or the abutment surface (25), the spacer (37) is designed to extend along the positioning surface (30) of the contacting device or along the abutment surface (25) of the charging contact device with respect to either a longitudinal axis (39) of the contacting device (11) or a longitudinal axis of the charging contact device (12), and the spacing means (35) is arranged on an end (28) of the contacting device (11) facing towards the charging contact device (12) or on an end (45) of the charging contact device (12) facing towards the contacting device.

2. The rapid charging system according to claim 1, characterized in that the contacting device (11) and the charging contact device (12) each comprise a vertical axis (29, 40), the respective vertical axes (29, 40) aligning flush when in the contacting position.

3. The rapid charging system according to claim 2, characterized in that the physical contact between the contacting elements (17) and the charging contact device (12) is prevented if the respective vertical axes (29, 40) are positioned so as to deviate from a shared alignment.

4. The rapid charging system according to claim 2, characterized in that the guiding device (36) positions the respective vertical axes (29, 40) in a shared alignment when guiding the contacting device (11) and the charging contact device (12) together.

5. The rapid charging system according to claim 3, characterized in that the contacting elements (17) and/or the charging contact elements (18) are designed such that the physical contact between the contacting elements and the charging contact device (12) is prevented if the respective vertical axes (29, 40) are positioned so as to deviate from a shared alignment by an angle α of >10°.

6. The rapid charging system according to claim 1, characterized in that the contacting element carrier (14) forms two, preferably three, positioning surfaces (30) which are designed so as to coincide with abutment surfaces (25) of the charging contact device (12) for abutting the contacting element carrier.

7. The rapid charging system according to claim 1, characterized in that the charging contact device (12) and/or the contacting device (11) comprise(s) a receptacle recess (27) of the guiding device (36) for the spacing means (35) when in the contacting position.

8. The rapid charging system according to claim 1, characterized in that the contacting device (11) can be arranged on a vehicle roof and the charging contact device (12) can be arranged on a stationary charging station or vice versa.

9. The rapid charging system according to claim 8, characterized in that a charging contact element carrier (19) forms a receptacle opening (22) for the contacting element carrier (14), said contacting element carrier being able to be inserted into the receptacle opening of the charging contact element carrier.

10. The rapid charging system according to claim 1, characterized in that the charging contact device (12) comprises a charging contact element carrier (19) having charging contact elements (18).

11. The rapid charging system according to claim 10, characterized in that a receptacle opening (22) forms a guide for the contacting element carrier when guiding the contacting element carrier (14) and the charging contact element carrier (14) together.

12. The rapid charging system according to claim 10, characterized in that the charging contact element carrier (19) is designed as a roof-shaped longitudinal rail adapted to be arranged in a moving direction of the vehicle, the charging contact elements (18) being designed as conductor strips (20).

13. The rapid charging system according to claim 1, characterized in that the contacting elements (17) are formed in the shape of bolts, said contacting elements being resiliently mounted on the contacting element carrier (14).

14. The rapid charging system according to claim 1, characterized in that the positioning device (13) comprises a pantograph or a rocker by means of which the contacting device (11) can be positioned in a vertical direction with respect to the charging contact device (12).

15. The rapid charging system according to claim 1, characterized in that the positioning device (13) comprises a crossbeam by means of which the contacting element carrier (14) can be positioned transversely to the charging contact device (12), said contacting element carrier being arranged on the crossbeam so as to be freely displaceable.

16. A method for forming an electrically conductive connection between a vehicle and a stationary charging station, in particular for a rapid charging system (10) for electrically driven vehicles, such as electric busses or similar, having a contacting device (11), a charging contact device (12) and a positioning device (13), said charging contact station being electrically contacted using the contacting device when in a contacting position, said contacting device being positioned in a vertical and horizontal direction with respect to the charging contact device as well as being moved to the contacting position by means of the positioning device, contacting elements (17) of a contacting element carrier (14) of the contacting device being electrically contacted with charging contact elements (18) of the charging contact device for forming contact pairings in each instance when in the contacting position, a guiding device (36) of the rapid charging system guiding the contacting device and the charging contact device to the contacting position, characterized in that when guiding the contacting device and the charging contact device together, a physical contact between the contacting elements and the charging contact device is prevented by means of the guiding device before the contacting position is attained;

wherein the guiding device (36) comprises a spacing means (35) which is arranged on the contacting device (11) and/or the charging contact device (12), the spacing means (35) comprises a spacer (37) adapted to be guided along a positioning surface (30) of the contacting device (11) or along an abutment surface (25) of the charging contact device (12), and the spacer (37) comprises at least one roll (38) adapted to be rolled on the positioning surface (30) or the abutment surface (25), the spacer (37) is designed to extend along the positioning surface (30) of the contacting device or along the abutment surface (25) of the charging contact device with respect to either a longitudinal axis (39) of the contacting device (11) or a longitudinal axis of the charging contact device (12), and the spacing means (35) is arranged on an end (28) of the contacting device (11) facing towards the charging contact device (12) or on an end (45) of the charging contact device (12) facing towards the contacting device.

* * * * *